June 4, 1968

H. F. J. SPRENGEL 3,386,593

SHIP'S LOADING APPARATUS HAVING A CARGO
BOOM WITH A PLURALITY OF PENDULUM
PURCHASE BLOCK FITTINGS

Filed Dec. 6, 1966

INVENTOR.
HEINZ FERDINAND JOHANNES SPRENGEL

BY
Kenyon & Kenyon
ATTORNEYS

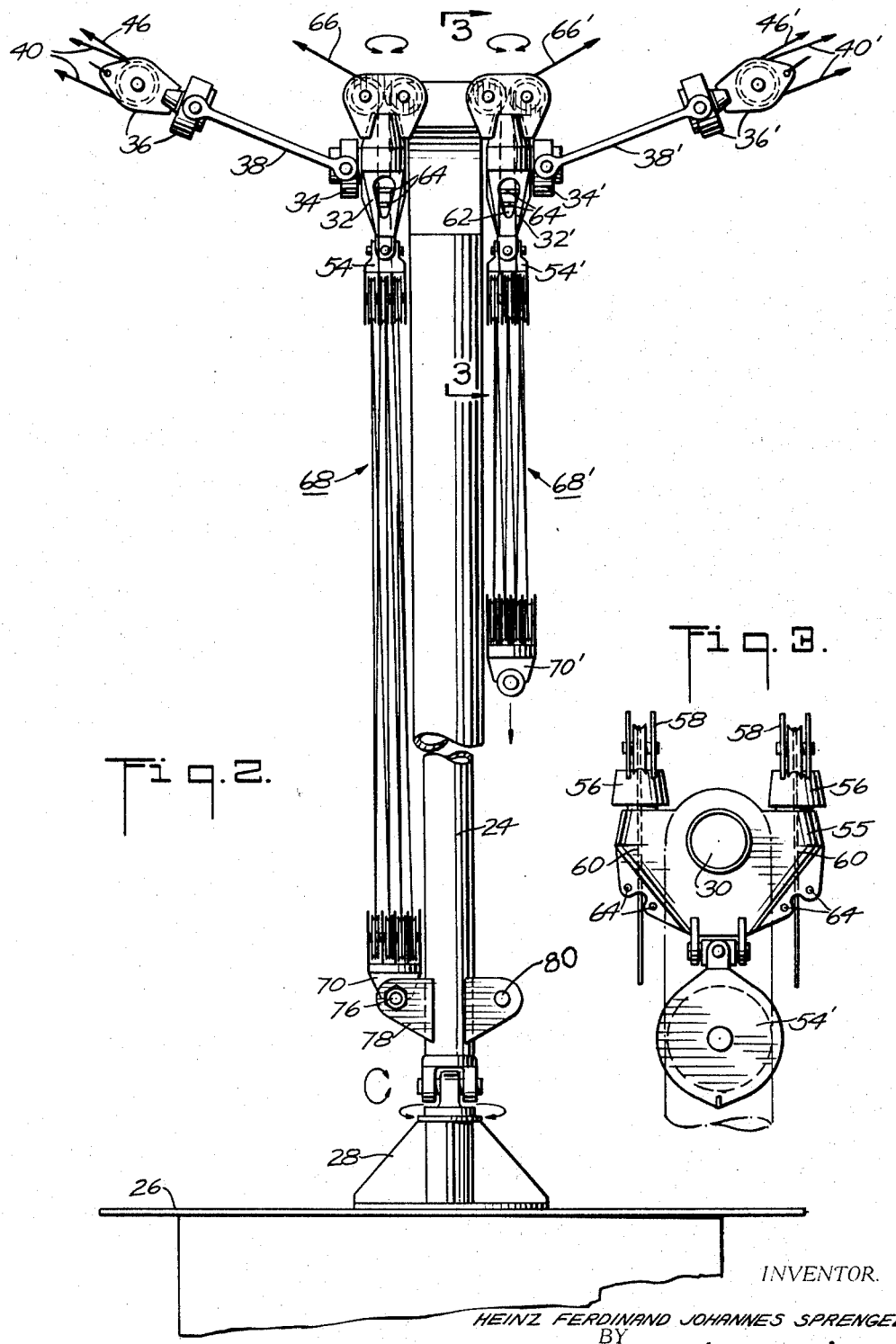

United States Patent Office 3,386,593
Patented June 4, 1968

3,386,593
SHIP'S LOADING APPARATUS HAVING A CARGO BOOM WITH A PLURALITY OF PENDULUM PURCHASE BLOCK FITTINGS
Heinz Ferdinand Johannes Sprengel, Hamburg-Poppenbuttel, Germany, assignor to Blohm & Voss A.G., Hamburg-Steinwerder, Germany, a company of Germany
Filed Dec. 6, 1966, Ser. No. 599,592
Claims priority, application Germany, Jan. 20, 1966, St 24,876
1 Claim. (Cl. 212—3)

ABSTRACT OF THE DISCLOSURE

Ship's loading apparatus having a cargo boom which is pivotally mounted on deck and is capable of a swinging-through maneuver between two uprights, characterized by the fact that selectively the right or left lower purchase block of the respective purchase tackle half is secured to the lower end of the cargo boom.

Disclosure of the invention

This invention relates to a ship's loading apparatus. More particularly, it relates to a ship's loading apparatus having a cargo boom which may swing through and between uprights on a ship's deck to serve hatches both forward and aft of the boom mounting. Still more particularly, it relates to a ship's loading apparatus of the type described which has a plurality of pendulum purchase block fittings mounted to the cargo boom.

A cargo boom arrangement of the kind described above is shown generally in United States Patent No. 3,236,390, which issued on Feb. 22, 1966. In the arrangement shown in this patent, a ship's loading apparatus is described which has a cargo boom capable of a swinging-through maneuver from a position over a forward hatch to one over an aft hatch, and vice versa. The cargo boom swings between uprights on the ship's deck, and the tackles and hauling parts of the arrangement are automatically guided free of the uprights such that neither the winches associated with the apparatus nor the cargo load need be disconnected. The arrangement of this patent is particularly suitable for moving heavy cargo, however, and it provides a hoisting and lowering speed which is considerably slower than that which is customary and desirable for the handling of light loads. Owing both to the weight and also to the usual bulky dimensions of heavy cargo loads, safety considerations require that such cargo be moved at substantially slower speeds than light loads, and, due to its relatively slow speed, the ship's loading apparatus of United States Patent No. 3,236,390 requires more time for loading and unloading than is desirable for efficient and economical handling of light loads.

Speaking generally, the ship's loading apparatus of the present invention comprises a cargo boom which is pivotally and rotatably secured between two uprights and which is capable of swinging through and between the uprights to transport a load. The cargo boom is provided with a head pin and a pair of pendulum purchase block fittings which depend from the head pin on opposite sides of the cargo boom. Hauling parts extend to a movable purchase block from which the load to be transported is suspended, and also to a fixed purchase block which is affixed to the lower end of the cargo boom. As a result of the affixing of one-half of the purchase tackle to the lower end of the cargo boom, this portion does not operate as a lifting or lowering tackle. The effective load movable by the apparatus is also thereby reduced to about one half of what it would be if the cargo were suspended from both of the purchase blocks instead of affixing one of the purchase blocks to the lower end of the boom. On the other hand, however, the hoisting and lowering speed of the unattached purchase block is about twice what it would be if both of the purchase blocks were freely movable and the cargo suspended therefrom.

It is one object of the present invention to provide a ship's loading apparatus for rapid raising and lowering of light loads.

It is another object of the present invention to provide a ship's loading apparatus for the rapid handling of light loads which has a cargo boom which can readily alternate for short periods of time between a position over a forward hatch to one over an aft hatch, and vice versa.

It is another object of the present invention to provide a ship's loading device for the rapid handling of light loads in which bending or torsional forces on the cargo boom are reduced by the use of a plurality of opposed pendulum purchase block fittings.

The nature of the invention as well as its objects and advantages will be more fully perceived and understood from the following description and claim taken in conjunction with the accompanying drawings, in which:

FIG. 2 is a front elevation of the cargo boom of FIG. 1 in a vertical or upstanding position; and FIG. 3 is a cross-sectional view along the line 3—3 of FIG. 2 of a pendulum purchase block fitting and upper purchase block at one side of the cargo boom in the illustrated embodiment.

Figure 1:
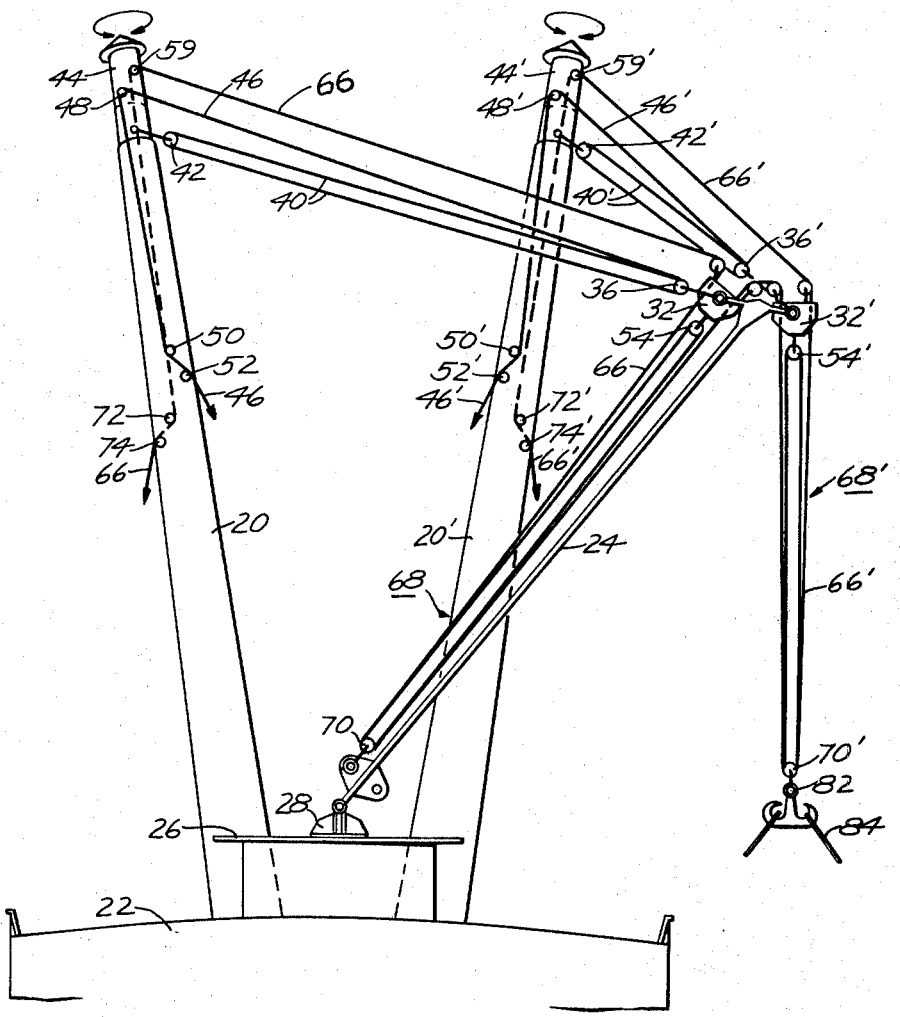
FIG. 1 is a partially schematic front elevation of an embodiment of the invention which shows a cargo boom on one side of two uprights on a ship's deck.

In the embodiment of the invention which is illustrated in the figures, two outwardly-inclined spaced-apart hollow upright 20, 20' are fixedly mounted to a ship's deck 22 between cargo hatches (not shown). One of the hatches is forward of the uprights of FIG. 1 and the other is aft of or behind the uprights shown therein. A cargo boom 24 is mounted to platform 26 in a universally pivotable manner by a gooseneck fitting 28 which is between and substantially in line with the uprights 20, 20'. Platform 26 and deck 22 together comprise a support member for the uprights and the cargo boom.

A head pin or pivot pin 30 is mounted within the upper end of cargon boom, and extends equal distances on two sides of the boom. Head pin 30 carries on each of its opposing extensions a pendulum purchase block fitting 32, 32' and a cross-swivel 34, 34'. Each of the fittings 32, 32' is rotatably mounted to the head pin such that each can swing forward and aft of the cargo boom independently of the other, as normal rather than invented pendulums.

A span block 36, 36' is connected to each of the cross-swivels 34, 34' by means of connecting straps or flat links 38, 38'. Span or topping tackle parts 40, 40' extend between span blocks 36, 36' and span blocks 42, 42'. Span blocks 42, 42' are attached in a known vertically-movable fashion to the heads 44, 44' of uprights 20, 20'. Heads 44, 44' are mounted within and fully rotatable with respect to their respective uprights. The hauling parts 46, 46' of the span tackles 40, 40' run from span blocks 36, 36' to guide sheaves 48, 48' which are mounted to and within heads 44, 44', thence down these heads and into their respective uprights 20, 20', thence over guide sheaves 50, 50' and 52, 52' which are mounted to and within the uprights, and finally through slots in the walls of the uprights to the drums of span or topping winches (not shown).

Each pendulum purchase block fitting 32, 32' is rotatably overhung on head pin 30 on opposite sides of cargo boom 24, between the cargo boom and a cross-swivel 34, 34'. An upper purchase block fitting 54, 54' is movably suspended from each of the pendulum purchase block fittings 32, 32' (see FIGS. 2 and 3). Each of the pendulum purchase block fittings includes a body portion 55, two axle heads 56 mounted to the body portion, and two guide sheaves 58, each of which is rotatably mounted to an axle head and each of which is adapted to receive a hauling part of an upper purchase block and direct the same away from the boom and toward an upright. Each pendulum purchase block further includes two internal passages 60 in its body portion and axle heads through which the hauling parts of an upper purchase block can extend to the guide sheaves 58. Passage 60 has a lower opening 62, and centering means 64 are provided below opening 62 for maintaining the hauling parts passing through the passage substantially centered in the passage. As may be seen by reference to FIGS. 2 and 3, guide sheaves 58 extend above the upper end of the boom 24 when the boom is in its vertical or upstanding position.

The hauling part 66 of purchase tackle half 68 runs from a lower purchase block 70 through a passage 60 in the body portion of pendulum purchase block fitting 32 and an axially aligned passage in an axle head 56 to a guide sheave 58 and from there to guide sheave 59 which is mounted to and within hollow head 44 on upright 20. Leaving guide sheave 59, line 66 passes down through head 44 and into upright 20 and over guide sheaves 72 and 74 within the upright. Hauling part 66 finally passes through a slot in the wall of upright 20 to the drum of a purchase or cargo winch (not shown).

The hauling part 66' of purchase tackle half 68' runs from a lower purchase block 70' through a passage 60 in the body portion of pendulum purchase block fitting 32' and an axially aligned passage in an axle head 56 to a guide sheave 58, and from there to guide sheave 59' which is mounted to and within hollow head 44' on upright 20'. Leaving guide sheave 59', purchase tackle hauling part 66' passes down through head 44' and into upright 20', and over guide sheaves 72' and 74' within the upright 20' to the drum of a purchase or cargo winch (not shown).

The lower purchase block 70 of tackle half 68 is removably secured by means of a bolt 76 to a tie-member 78 affixed to the cargo boom near the lower end of the boom. Tie-member 78 has two flange portions each of which has a tie-opening 80 therethrough. Bolt 76 passes through a tie-opening 80 and an aligned aperture in lower purchase block 70. The flange portions are mounted to opposite sides of the cargo boom such that their tie-openings are in substantial vertical alignment with a pendulum purchase block fitting 32, 32' when boom 24 is in its upstanding or vertical position of FIG. 2.

It is seen that the ship's loading apparatus of FIGS. 1–3 comprises a fixed tackle half 68 as well as a movable tackle half 68' from which the cargo load depends. It is also seen that hauling parts 66 of the fixed tackle half run from a purchase winch to a guide sheave 58 on the pendulum purchase block fitting 32 belonging to the fixed purchase tackle half, to a guide sheave 58 on the pendulum purchase block fitting 32' of the movable purchase tackle half 68'. From that point the hauling parts, now identified by reference numeral 66', run through the movable pendulum purchase block fitting 32' to the freely movable lower purchase block 70', as well as over a guide sheave 58 of the movable pendulum purchase block fitting to the other upright 20'. Hauling parts 66' are then guided to the drum of another purchase or cargo winch (not shown). It is also possible to provide one cargo winch only. In this case, the hauling part 66, for example, may be secured to the span swivel member 44.

Cargo boom 24 is shown in FIG. 1 in position to work a hatch forward of the uprights 20, 20'. To raise a load suspended from movable lower purchase block 70', hauling parts 66 and 66' are drawn in by the cargo winches to which their ends are connected; and to lower a load suspended from lower purchase block 70', these hauling parts are paid out by their cargo winches. To move the boom into the vertical position shown in FIG. 2, hauling parts 46 and 46' are drawn in by the span winches connected to the ends of these hauling parts, with lower purchase block 70' being raised by hauling parts 66 and 66', if necessary, such that the cargo load does not interfere with deck equipment. To move boom 24 from its vertical position shown in FIG. 2 to a position over an aft hatch, for example, the boom is pulled aft by an attached wire pendant (not shown), for example, which is led to a winch or other suitable pulling source. Lower purchase block 70' may then be lowered by paying out hauling parts 66 and 66' by means of the purchase winches. To slew the cargo boom to port or starboard, that is to the left or right of the position shown in FIG. 1, the hauling part 46 or 46' on the side of the assembly corresponding to the side toward which it is desired to slew the cargo boom is drawn in, and the other hauling part 46 or 46' is paid out by their respective span or topping winches. In all positions of the cargo boom the pendulum purchase block fitting 32' remains substantially vertical.

As is apparent, the swinging-through, slewing and raising and lowering maneuvers just described may be done rapidly and do not require specially trained personnel nor the disconnection of the cargo or any of the winches, thereby expediting the loading and unloading of cargo.

It is seen how by practicing this invention in the manners described it is possible to provide a ship's loading apparatus with two pendulum purchase block fittings which can raise and lower cargo and swing cargo through upright members more rapidly than prior similar apparatuses and which is particularly suitable for efficient handling of light loads. Further, it is seen how by practicing this invention in the manners described, it is possible to provide a ship's loading apparatus which can be selectively modified to handle heavy loads by disconnecting the fixed lower purchase block 70 from the lower end of the cargo boom and instead coupling both it and the other lower purchase block 70' to the load to be transported. Thus, a versatile ship's loading apparatus is provided which is readily adaptable to the type of load to be displaced, thereby avoiding a need to have special and separate loading apparatuses for light and for heavy loads aboard a ship. It is further seen how, by practicing this invention in the manners described, an apparatus for the rapid handling of light loads is provided in which bending or torsional forces in the cargo boom are reduced by the use of opposed tackle halfs.

Although the invention has been described with a certain degree of particularity, it is understood that the present disclosure has been made only by way of example and that changes may be made in the details of construction and operation, and in the combination and arrangement of parts, without departing from the spirit and scope of the invention. Thus, for example, although in the illustrative embodiment of the invention, hauling parts 66, 66' pass within passages 60 in the pendulum purchase block fittings to guide sheaves 58 located above head pin 30, it is apparent that the hauling parts may instead pass over guide sheaves which are operatively connected to the head of boom 24 below the head pin 30 and alongside of or above pendulum purchase block fittings 32, 32'. Similarly, although guide sheaves 48, 50, 52, 59, 72 and 74 of upright 20, and the corresponding guide sheaves of upright 20', are located within the uprights and the head 44 in the illustrative embodiment, it is apparent that similar guide sheaves may instead be affixed outside the longitudinal walls of the uprights.

What is claimed is:

1. The combination comprising (1) a cargo boom having an upper end and a lower end, (2) a head pin extending transversely from opposite sides of said cargo boom near the upper end thereof, (3) a pair of purchase block fittings, each fitting being pivotally mounted closely adjacent said cargo boom to swing from side to side of said cargo boom as a normal pendulum with said boom in substantially upright position, one fitting being so mounted on one extension of said head pin and the other fitting being so mounted on the opposite extension of said head pin, each fitting including guide means extending above the upper end of said boom in upright position which is adapted to receive handling parts of purchase tackle and direct the same away from said boom, (4) a pair of upper purchase blocks, each suspended from a purchase block fitting, (5) a pair of lower purchase blocks, tackle suspending each lower purchase block from an upper purchase block, (6) a tie member affixed to the cargo boom near its lower end to rotate with the boom, said tie member having oppositely extending flange portions each with a tie opening therein, securing means for fastening one of said lower purchase blocks to said tie member, and means for suspending a load from the other of said lower purchase blocks.

References Cited
UNITED STATES PATENTS

| | | | |
|---|---|---|---|
| 2,973,942 | 3/1961 | Schaper | 254—188 |
| 3,236,390 | 2/1966 | Sprengel | 212—3 |
| 3,258,249 | 6/1966 | Williams | 212—3 |
| 3,263,965 | 8/1966 | Mutch | 212—3 |

EVON C. BLUNK, *Primary Examiner.*

H. C. HORNSBY, *Assistant Examiner.*